(12) United States Patent
Rosenberg et al.

(10) Patent No.: US 7,898,941 B2
(45) Date of Patent: Mar. 1, 2011

(54) METHOD AND SYSTEM FOR ASSIGNING A PLURALITY OF MACS TO A PLURALITY OF PROCESSORS

(75) Inventors: Koby Rosenberg, Even Yehuda (IL); Avishay Halavy, Tel-Aviv (IL)

(73) Assignee: Polycom, Inc., Pleasanton, CA (US)

( * ) Notice: Subject to any disclaimer, the term of this patent is extended or adjusted under 35 U.S.C. 154(b) by 132 days.

(21) Appl. No.: 12/196,700

(22) Filed: Aug. 22, 2008

(65) Prior Publication Data

US 2009/0067320 A1    Mar. 12, 2009

Related U.S. Application Data

(60) Provisional application No. 60/971,415, filed on Sep. 11, 2007.

(51) Int. Cl.
*H04L 1/00* (2006.01)

(52) U.S. Cl. .................................. 370/217; 370/225

(58) Field of Classification Search ................ 370/217, 370/218, 219, 220, 225, 226, 227, 228
See application file for complete search history.

(56) References Cited

U.S. PATENT DOCUMENTS

| 6,198,741 | B1 * | 3/2001 | Yoshizawa et al. | 370/392 |
|---|---|---|---|---|
| 6,208,616 | B1 * | 3/2001 | Mahalingam et al. | 370/216 |
| 6,253,334 | B1 * | 6/2001 | Amdahl et al. | 714/4 |
| 6,314,525 | B1 * | 11/2001 | Mahalingham et al. | 714/4 |
| 6,590,861 | B1 | 7/2003 | Vepa et al. | |
| 6,760,859 | B1 | 7/2004 | Kim et al. | |
| 7,085,224 | B1 | 8/2006 | Oran | |
| 7,391,719 | B2 * | 6/2008 | Ellis et al. | 370/219 |
| 7,502,314 | B2 * | 3/2009 | Shimizu | 370/227 |
| 7,706,255 | B1 * | 4/2010 | Kondrat et al. | 370/219 |
| 2002/0156613 | A1 | 10/2002 | Geng et al. | |
| 2005/0010837 | A1 | 1/2005 | Gallagher et al. | |
| 2005/0050398 | A1 * | 3/2005 | Rao et al. | 714/39 |

(Continued)

FOREIGN PATENT DOCUMENTS

EP    1 777 909 A1    4/2007

(Continued)

OTHER PUBLICATIONS

European Search Report and Written Opinion received in corresponding application No. 08015311.7 dated Dec. 3, 2008.

(Continued)

*Primary Examiner*—Chi H. Pham
*Assistant Examiner*—Kevin Mew
(74) *Attorney, Agent, or Firm*—Wong, Cabello, Lutsch, Rutherford & Brucculeri, LLP

(57) ABSTRACT

A bank of processing units is connected to a number of LANs via a bank of MAC controllers. An interconnect switch allows any of the processing units to access any of the MAC controllers. A housekeeping processor periodically detects faults in the connectivity of the processing units to the LANs. When a fault is detected, a redundant processing unit is assigned to be connected to the LAN. If a fault still exists, then a redundant MAC controller is assigned to the redundant processing unit. The MAC address of the previous MAC controller is reassigned to the redundant MAC controller.

30 Claims, 2 Drawing Sheets

U.S. PATENT DOCUMENTS

| | | | |
|---|---|---|---|
| 2006/0029097 A1* | 2/2006 | McGee et al. | 370/468 |
| 2007/0086442 A1* | 4/2007 | Waitzmann | 370/352 |
| 2007/0268820 A1* | 11/2007 | McGee et al. | 370/217 |
| 2008/0285469 A1* | 11/2008 | Toda et al. | 370/244 |

FOREIGN PATENT DOCUMENTS

| | | |
|---|---|---|
| JP | 2005-244672 | 8/2005 |

OTHER PUBLICATIONS ip infusion™ white paper; "A Redundant Architecture for Routing Protocols" Copyright 2002 IP Infusion Inc.

Translation of an Office Action of Japan Patent Office, Mailing Date: Oct. 26, 2010 with attachment.

* cited by examiner

METHOD AND SYSTEM FOR ASSIGNING A PLURALITY OF MACS TO A PLURALITY OF PROCESSORS

CROSS-REFERENCE TO RELATED APPLICATIONS

This application is a non-provisional application claiming the benefit of the priority date of U.S. Provisional Application Ser. No. 60/971,415, filed on Sep. 11, 2007, the entire contents of which are incorporated herein by reference.

BACKGROUND

1. Field of Invention

The present invention relates to the field of communication systems, and more particularly to improving the quality of fault detection and recovery methods of connectivity between a plurality of clients from a plurality of LANs and a networking device having a bank of processing nodes (units).

2. Description of Background Art

In systems of networking devices based on plurality of processoring units connected to one or more Ethernet Local Area Networks (LANs), it is challenging to provide Reliability, Availability, and Serviceability (RAS) connection for more than 99.999% of the time while maintaining good separation between the different LANs to achieve security needs. A networking device can be a node in a network that communicates and services a plurality of users. An exemplary networking device can be a multipoint control unit (MCU), a firewall, a content server, a media server, etc.

In a common networking device, one or more Media Access Controls (MAC) addresses are associated with one processing unit as long as the system is up and running. A MAC address can refer to an Ethernet Hardware Address (EHA) or a hardware address. A MAC address is an identifier that is attached to most network adapters (i.e., network interface cards (NICs)) as the name of the adapter. In such a common architecture, if a processing node fails to operate or needs to be replaced, there is no way to support the functionality of the processor to a standby processoring unit without switching to another MAC. Using a redundant MAC/Processor pair results in high cost/utilization ratio. Furthermore, one MAC/Processor standby pair would be required for each LAN. A failure occurring on the MAC or somewhere along the physical path (PHY or cable) results in disconnecting the processor even though the processor is not in a permanent fault condition, and would otherwise be capable serving users from other LANs.

Thus, it is evident that current technologies of multi processors equipment create significant difficulties in reliable connectivity with external Ethernet LANs.

SUMMARY

The above-described needs are met using a topology in which a plurality of MACs responsible for tasks specified by the data link layer of an Open System Interconnect module/stack are separated from a plurality of processing nodes (units). The processing nodes are responsible for handling tasks related to the OSI's layer three and above responsibilities. The above group of MAC controllers functions as a connectivity resource pool for the plurality of processing nodes, which function as a processing resource pool and are separated from the MAC controllers. In such a topology the two resource pools can be connected to one another on the fly, delivering the required Reliability Availability and Serviceability.

DETAILED DESCRIPTION

Like numerals represent like elements in the figures. For convenience, only some elements of the same group may be labeled with numerals. The purpose of the drawings is to describe exemplary embodiments and not for production. Therefore features shown in the figures are chosen for convenience and clarity of presentation only.

Figure 1:
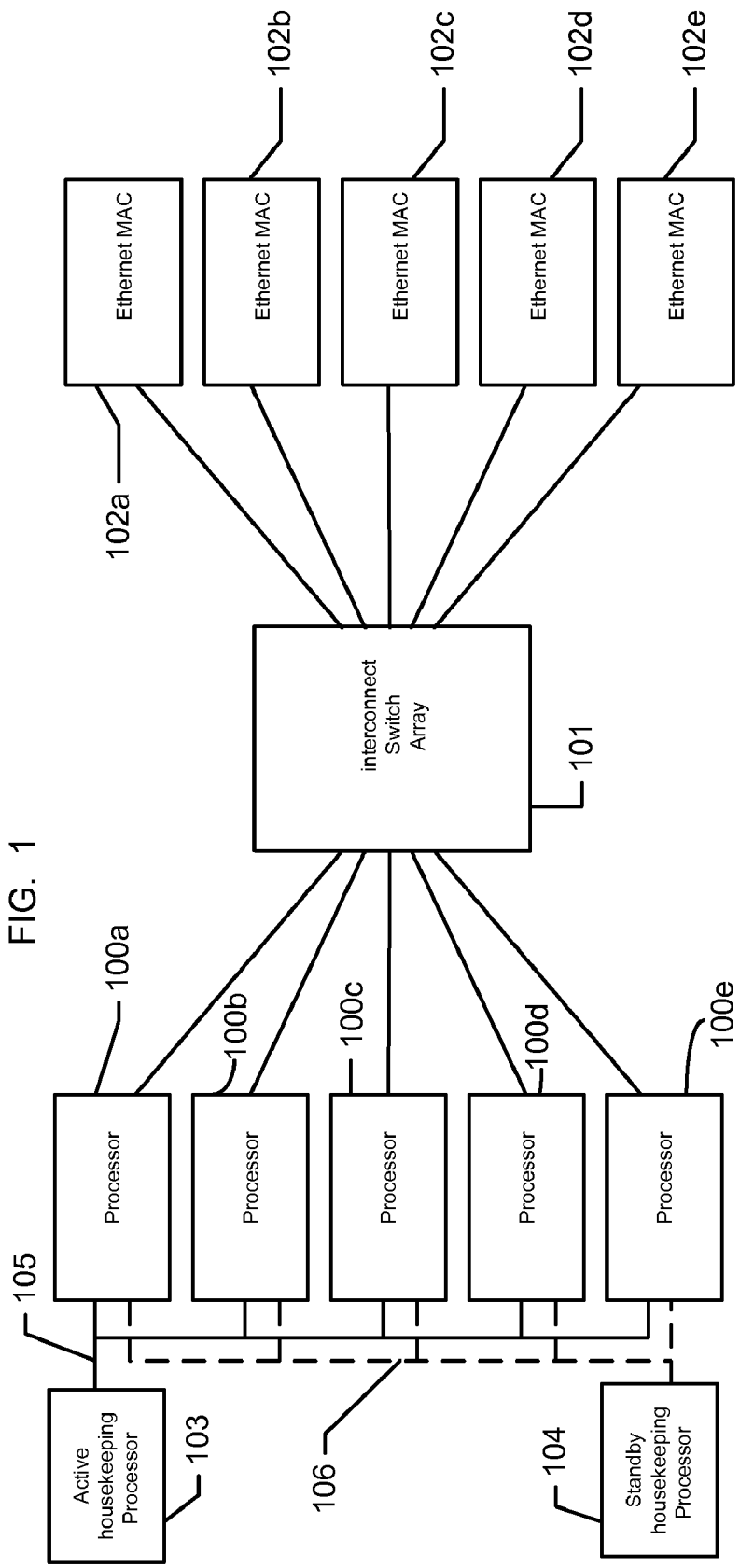
FIG. 1 is a block diagram illustrating an exemplary networking device system based on a plurality of processing units (nodes) and a bank of MAC controllers connected by a interconnect switch array.

FIG. 1 schematically illustrates elements of an exemplary networking device system based on plurality of processing nodes/units 100a-100e and a bank of MAC controllers 102a-102e connected by an interconnect switch array 101. The number of processing nodes and the number of MAC controllers are not limited to the ones shown in FIG. 1. For example, the system may have two processor nodes and five MAC controllers. Various other combinations can also be arranged. Each MAC controller 102a-102e is responsible for tasks specified by the data link layer of the OSI module/stack. For example, each MAC controller (102) can comply with communication protocols employed by the data link layer such as, but are not limited to, 802.3 CSMA/CD, 802.1P and 802.1Q.

Referring to FIG. 1, the MAC controllers 102a-102e can be divided in one or more banks. Each bank can be associated with a broadcasting domain such as a local area network (LAN) of a plurality of users. Each broadcasting domain can be associated with a bank of 'N' MAC addresses and a bank of 'N+1' MAC controllers. The MAC controllers can be physically connected to a broadcast domain. Each of the MAC addresses from this domain can be assigned to a corresponding MAC controller that belongs to the same domain. N is the number of active MAC controllers connected to the same broadcast domain and the '+1' MAC controller is the non-active redundant MAC controller (i.e., a standby MAC controller). A MAC address of a MAC controller can be reused or reassigned to the standby redundant MAC controllers, should the need arise. A broadcast domain is a segment of a computer network, in which all nodes, can reach each other by broadcast at the data link layer. Routers and other higher-layer devices form boundaries between broadcast domains. An exemplary broadcasting message that can be used in a broadcasting domain is when a first computer has only the network address of a second computer (an IP address, for example). The first computer may use the Address Resolution Protocol (ARP) and broadcasts an ARP request with the IP address of the second computer. The second computer, if connected to the same broadcasting domain can respond with its MAC address.

Usually MAC addresses are allocated by IEEE organization to vendors of network devices and network interface cards (NIC). Then each vendor can allocate a MAC address per each NIC. A reader who wishes to learn more about the process of allocating MAC addresses is invited to visit IEEE Standards Association website.

In the exemplary embodiments that are disclosed, a group of 'N' MAC addresses is allocated to a network device, an MCU for example. The group can be managed by a housekeeping computer 103 or 104. A MAC address, from the group, can be allocated to any one of the Ethernet MAC controllers 102 that is active (connected to a broadcasting domain). A standby Ethernet MAC controller 102 is not associated with a MAC address. Usually the number of MAC controllers 102 is larger than 'N', 'N+1' for example, in order to include redundancy.

When a new connection to a broadcasting domain is established, a processor 100 and an Ethernet MAC controller 102 are selected and associated with each other via interconnected switch array 101. A MAC address from the group of MAC addresses is transferred by the active housekeeping processor 103 to the selected processor 100 with an instruction to load the MAC address into the associated Ethernet MAC controller 102. Subsequently, the connection to the broadcasting domain is established.

The MAC controller is typically connected to a physical entity (10/100/1000base-T PHY, for example, not shown on FIG. 1) that according to the OSI module/stack is responsible for transmission of unstructured bit streams over a physical medium. The OSI physical layer tasks may comply with 10base-T, 100Base-T, 1000base-T, 1000base-LX, or 1000base-SX, for example.

Each processing node 100a-100e is responsible for handling the tasks related to OSI's layer three and above. For example, each processing node 100a-100e can handle IP (Internet Protocol), DHCP (Dynamic Host Configuration Protocol), IPSEC (IP Security) and ICMP (Internet Control Massage Protocol). The OSI Transport layer tasks can include TCP (Transport Control Protocol), UDP (User Datagram Protocol) and RTP (Real-time Transport Protocol), for example. Other tasks relating to the upper layers of the OSI module can include handling audio signals such as G.711, Video signals such as H.261, security related tasks such as SSH (Secure Shell), internet management such as SNMP (Simple Network Management Protocol), Network timing such as NTP (Network Time Protocol), and other applications such as HTTP (Hyper Text Transport Protocol) or FTP (File Transfer Protocol).

The interconnect switch array 101 can comply with various standards such as but not limited to PCI express, RapidIO, or a cross bar array implemented by Field Programmable Gate Array, for example. An exemplary switch can be VSC3312 manufactured by Vitsse Semiconductor Corporation, CA USA. A reader who wishes to learn more about switch arrays is invited to visit Vitsse site: www.vitsse.com. Processing nodes 100a-100e can communicate over an internal network 105 with an active housekeeping processor (processing node) 103. Network 105 can be a circuit switched network, packet switched network, carrier sense media access network, or any technology that allows two or more processing nodes to communicate with each other. In some embodiments an additional housekeeping set including processor 104 and network 106 can be added for redundancy and reliability. Networks 105 and 106 are separate from the external LANs (not shown in the drawings) that are connected to the other side of the Ethernet MAC controllers 102. In some embodiments the housekeeping tasks can be executed by one of the processing nodes 100 in addition to its other tasks.

Figure 2:
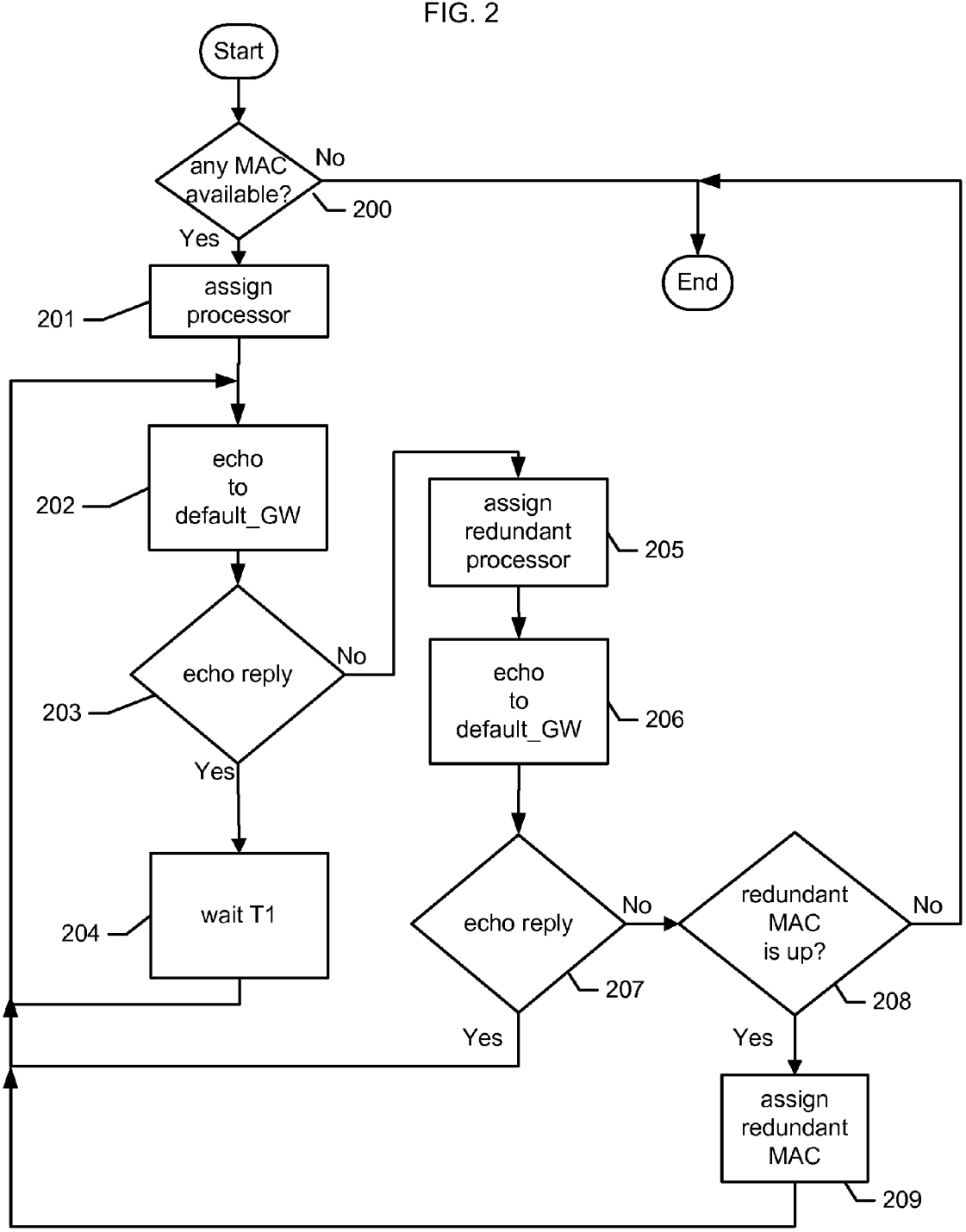
FIG. 2 is a flowchart illustrating an assignment process of a MAC controller with a processing node in three phases: before fault detection, during fault detection, and after fault detection.

During initiation the housekeeping processing unit 103 can assign a MAC address from a bank of addresses associated with a certain LAN to a MAC controller (102a-102e) that belongs to a bank of controllers associated with the same LAN. After initiation, the binding and re-binding of the MAC controller (102a-102e) to a processor (100a-100e) by the interconnect switch array (101) can be executed as a process such as illustrated in FIG. 2, in which a smooth and rapid failover to a redundant MAC controller or processing node is possible. After binding a MAC controller (102a-102e) with a processor (100a-100e), a MAC address is allocated to the processor. The processor (100a-100e) transfers the allocated MAC address to its newly bonded MAC controller via the connection that was established by the processor via the interconnect switch array (101).

FIG. 2 illustrates an assignment process of a MAC controller with a processing node before, during, and after fault detection. The process can be implemented by the active housekeeping processing node 103, via network 105, for example.

Fault detection is the process in which an abnormal behavior in the system is detected. The flowchart starts during establishing a connection between a client and a processing node and a broadcasting domain. A decision is made in step 200 whether one of the MAC controllers 102a-102e is available. An available MAC controller is the one that is physically connected to the broadcasting domain over its physical layer. If there are no available MAC controllers, then the process ends. If there is an available MAC controller, the processing node is dynamically assigned and bonded (step 201) to the available MAC controller via interconnection switch array 101 (FIG. 1). Once the dynamic assignment of the MAC/Processor pair is completed, a free MAC address from the group of MAC addresses is assigned to the pair. In an example of the present invention, the MAC address is allocated by active housekeeping processor to the assigned processor, which, in turn, loads the MAC address to its associated MAC controller 102.

Then, the process of fault detection stage begins. The exemplary fault detection process presented in FIG. 2 uses ICMP packets (echo packets) to periodically monitor the user network. The destination of the echo packet can be the default gateway IP address of the LAN to which the MAC controller is connected. The housekeeping processor 103 can request the processing unit 100 to send echo packets and to acknowledge back if an echo reply was received. The housekeeping processor, through this process of requests and acknowledgments, monitors the validity of the connection of the processing unit to the user LAN, thereby detecting a fault if one occurs along the connectivity path.

The fault detecting process begins with sending an echo to default gateway IP address (step 202) and the decision (step 203) if an echo reply was received indicating that the connection with the gateway is alive. The default gateway is the default gateway of the broadcasting domain to which the assigned MAC controller is connected. After T1 seconds (step 204) the fault detect process resumes by issuing a new echo packet (step 202). If (step 203) the echo reply was not received, indicating that a fault was detected, recovery phase is initiated (steps 205 to 209). T1 can be a configurable parameter; it can be in the range of few milliseconds to few seconds, depending on the broadcasting domain and the connection between the MAC controller 102 (FIG. 1) and the broadcasting domain.

The first stage of the recovery phase is to assign, via interconnect switch array 101 (FIG. 1), a redundant processing node (step 205). The second stage is to issue a new echo packet (step 206). The third stage is to decide if the echo packet was received (step 207). If the echo reply was received, the fault detecting process resumes by issuing a new echo packet (step 202). The receipt of echo packet in step 207 indicates that no fault has been detected at that moment. If the echo reply was not received, then it indicates that a fault has been detected. Subsequently, a decision is made whether there is a standby redundant MAC controller (step 208) connected to the same broadcast domain as the suspected faulty MAC controller. Preferably, the redundant MAC controller is first assigned to the MAC address of the suspected faulty MAC to enable a smooth transition to the redundant path. In an alternate exemplary embodiment of the present invention the order of binding-rebinding can start with replacing a MAC controller and then a processor.

A process (not shown in FIG. 2) may start by disabling the current MAC controller and only then enabling the redundant MAC controller, to avoid MAC address duplication in the case the redundant MAC controller is indeed connected to the same broadcast domain. Using the same MAC address can minimize undesired effects caused once a new connectivity path is presented. When the redundant MAC controller uses the same MAC address (not simultaneously) as the faulty MAC controller, the user's network is not aware of the replacement. A Layer 2 switch involved in the connection, based on IEEE802.1D transparent bridging method, can be connected to the redundant MAC and automatically learns the new path just by receiving the upcoming echo packet. If a redundant MAC controller is available, the MAC controller is assigned to the processor (step 209) and the process of fault detection may continue (202).

The disclosed method and system improves the Reliability Availability and Serviceability of a networking device based on plurality of processing nodes (processors) that need to be connected to the user Ethernet Local Area Networks. The disclosed method and system reduces the unscheduled downtime of a processor system by providing a topology that support failover of any single point of failure a processor system might face. The disclosed method and system also reduces the scheduled downtime of a processor system to enable upgrade for example. Furthermore the disclosure provides a method and an apparatus for network separation, i.e., a firewall gateway, by enabling separation between MAC/Processors pairs.

The process 205 of replacing a processor by a redundant processor can include loading the redundant processor with the software and the information which is needed for handling the activities which were executed by the faulty processor. The process is executed by the active housekeeping processor 103 which can record the required information.

In the description and claims of the present application, each of the verbs, "comprise" "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. Software of a logical module can be embodied on a computer readable medium such as a read/write hard disc, CDROM, Flash memory, ROM, etc. In order to execute a certain task a software program can be loaded to an appropriate processor as needed.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

We claim:

1. A fault tolerant recoverable system comprising:
a plurality of processing units;
a plurality of MAC controllers;
an interconnect switch for communicably and dynamically associating one or more pairs, wherein each pair comprises a processing unit selected from the plurality of processing units and a MAC controller selected from the plurality of MAC controllers; and
a housekeeping processor communicably coupled to each of the plurality of processing units,
wherein the housekeeping processor is programmed to dynamically assign MAC addresses to each of the one or more pairs, each dynamically assigned MAC address belonging to a broadcasting domain, and
wherein for each pair, the processing unit is configured to communicate over the broadcasting domain via the MAC controller.

2. The system of claim 1, wherein the plurality of MAC controllers belong to a broadcasting domain.

3. The system of claim 1, wherein the housekeeping processor is communicably coupled to the plurality of processing units via a local area network.

4. The system of claim 1, wherein the housekeeping processor is programmed to assign another of the plurality of MAC controllers to the any one of the pairs upon failure of the MAC controller of the pair.

5. The system of claim 4, wherein the housekeeping processor is programmed to reassign the MAC address of the failed MAC controller to the another of the plurality of MAC controllers.

6. A method for recovering from a fault in connectivity of a processing unit/MAC controller pair to a broadcasting domain, comprising:
upon detection of a fault in connectivity of a processing unit/MAC controller pair having a first MAC address to the broadcasting domain, reassigning one of either a replacement processing unit or a replacement MAC controller to the processing unit/MAC controller pair;
validating the availability of the processing unit/MAC controller pair for connection to the broadcasting domain; and
if the processing unit/MAC controller pair is not available, assigning the other of a replacement processing unit or a replacement MAC controller to the processing unit/MAC controller pair; and
if a replacement MAC controller is reassigned to the processing unit/MAC controller pair, reassigning the first MAC address to the replacement MAC controller,
wherein validating the availability is executed with the first MAC address.

7. The method of claim 6, wherein detection of a fault is executed by sending a fault detection packet to a default gateway of the broadcasting domain.

8. The method of claim 6, wherein validating comprises sending a fault detection packet to the default gateway of the broadcasting domain.

9. The method of claim 7, wherein the fault detection packet is an ICMP echo packet.

10. The method of claim 8, wherein the fault detection packet is an ICMP echo packet.

11. The method of claim 6, further comprising determining if a replacement MAC controller is available and ending the method when a redundant MAC controller is not available.

12. The method of claim 6, wherein the sending of the detection of a fault, the reassigning of the redundant processing unit, the validating, the detection of another fault, the reassigning of the replacement MAC controller, and the reassigning of the first MAC address to the replacement MAC controller are executed by an active housekeeping processor.

13. The method of claim 12, wherein a standby housekeeping processor, communicably coupled to the active housekeeping processor and to the plurality of processing units, monitors the operation of the active housekeeping processor, and upon detecting a fault in the active housekeeping processor executes the sending of the detection of a fault, the reassigning of the redundant processing unit, the validating, the detection of another fault, the reassigning of the replacement MAC controller, and the reassigning of the first MAC address to the replacement MAC controller.

14. A method of maintaining a connection in a network, comprising:
providing a plurality of processing units;
providing a plurality of MAC controllers;
providing a plurality of MAC addresses, wherein the plurality of MAC addresses are assigned to the plurality of MAC controllers, and wherein the plurality of MAC controllers are assigned to at least one of the plurality of processing units;
providing a interconnect switch for communicably coupling the plurality of processing units to the plurality of MAC controllers; and
a housekeeping processor communicably coupled to the plurality of processing units, wherein from the housekeeping processor:
sending a first fault detection packet to a default gateway of the network;
reassigning, upon detection of a fault, a redundant processing unit for connecting to the network;
sending a second fault detection packet to the default gateway of the network;
determining, upon detection of a fault, availability of a redundant MAC controller for connecting to the network; and
reassigning the redundant MAC controller to the redundant processing unit for connecting to the network.

15. The method of claim 14, wherein the fault detection packet is an ICMP echo packet.

16. The method of claim 14, wherein the method ends when the redundant MAC controller is not available.

17. The method of claim 14, wherein the method is executed in an active housekeeping processor, and wherein the active housekeeping processor is communicably coupled to the plurality of processing units.

18. The method of claim 17, wherein a standby housekeeping processor monitors the operation of the active housekeeping processor, and upon detecting a fault in the active housekeeping processor, takes over the execution of the method, and wherein the standby housekeeping processor is communicably coupled to the plurality of processing units and the active housekeeping processor.

19. A method for setting a connection between a network device and a broadcasting domain, wherein the network device comprises a plurality of MAC controllers and a plurality of processors, and wherein a group of MAC addresses was allocated to the network device, the method comprising:
selecting an available processor from the plurality of processors;
selecting an available MAC controller from the plurality of MAC controllers;
binding the selected processor with the selected MAC controller into a pair of processor and MAC controller;
selecting an available MAC address belonging to the broadcasting domain from the plurality of MAC addresses; and
assigning the selected MAC address to the pair of processor and MAC controller,
wherein the selected processor is configured to communicate over the broadcasting domain via the selected MAC controller.

20. A fault tolerant recoverable communication system comprising:
a plurality of MAC controllers;
a processing unit communicably and dynamically associated with a first MAC controller selected from the plurality of MAC controllers; and
a housekeeping processor programmed to:
dynamically assign a MAC address associated with a broadcasting domain to an association of the processing unit and the first MAC controller;
assign a second MAC controller selected from the plurality of MAC controllers to the processing unit upon failure of the first MAC controller; and
reassign the MAC address to the second MAC controller,
wherein the processing unit communicates over the broadcasting domain via the first MAC controller or the second MAC controller.

21. The system of claim 20, wherein the housekeeping processor is embedded within the processing unit.

22. The system of claim 20, wherein the plurality of MAC controllers belong to a broadcasting domain.

23. The system of claim 20, wherein the processing unit is communicably and dynamically associated with a first MAC controller via a switch array.

24. A method for recovering from a fault in connectivity of a processing unit/MAC controller pair to a broadcasting domain, comprising:
detecting a fault in connectivity of a processing unit/MAC controller pair having a MAC address to the broadcasting domain, wherein the processing unit communicates over the broadcasting domain via the MAC controller; and
upon detection of the fault:
reassigning a replacement MAC controller to the processing unit; and
reassigning the MAC address to the replacement MAC controller,
wherein the MAC address belongs to the broadcasting domain.

25. The method of claim 24, wherein the detecting comprises sending a fault detection packet to a default gateway of the broadcasting domain.

26. The method of claim 25, wherein the fault detection packet is an ICMP echo packet.

27. The method of claim 24, wherein the detecting, the reassigning of the replacement MAC controller, and the reassigning of the MAC address to the replacement MAC controller are executed by a housekeeping processor.

28. A method of maintaining a connection in a network, comprising:
assigning a MAC address associated with a broadcasting domain of the network to one of a plurality of MAC controllers, the one of a plurality of MAC controllers being assigned to a processing unit communicably coupled to the plurality of MAC controllers, wherein the processing unit is configured to communicate over the broadcasting domain of the network via the MAC controller;

using a housekeeping processor to execute a housekeeping application causing the housekeeping processor to:

send a fault detection packet to a default gateway of the network;

upon detection of a fault, reassign a redundant MAC controller for connecting to the network;

reassign the MAC address to the redundant MAC controller; and reassign the redundant MAC controller to the processing unit for connecting to the network.

29. The method of claim 28, wherein the housekeeping processor is embedded with the processing unit.

30. The method of claim 28, wherein the processing unit is communicably coupled to the plurality of MAC controllers via a switch array.

\* \* \* \* \*